United States Patent
Inomata (10) Patent No.: US 12,051,545 B2
(45) Date of Patent: Jul. 30, 2024

(54) CERAMIC ELECTRONIC DEVICE INCLUDING DIELECTRIC LAYER CONTAINING PEROVSKITE COMPOUND WITH YTTRIA-STABILIZED ZIRCONIA, AND MANUFACTURING METHOD OF SAME

(71) Applicant: TAIYO YUDEN CO., LTD., Tokyo (JP)

(72) Inventor: Yasuyuki Inomata, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 78 days.

(21) Appl. No.: 17/864,179

(22) Filed: Jul. 13, 2022

(65) Prior Publication Data

US 2023/0046855 A1 Feb. 16, 2023

(30) Foreign Application Priority Data

Aug. 2, 2021 (JP) .................. 2021-126539
Jul. 8, 2022 (JP) .................. 2022-110418

(51) Int. Cl.
  H01G 4/12 (2006.01)
  C04B 35/626 (2006.01)
  H01G 4/012 (2006.01)
  H01G 4/30 (2006.01)

(52) U.S. Cl.
  CPC ..... *H01G 4/1236* (2013.01); *C04B 35/62645* (2013.01); *H01G 4/012* (2013.01); *H01G 4/1218* (2013.01); *H01G 4/30* (2013.01); *C04B 2235/3262* (2013.01); *C04B 2235/3418* (2013.01)

(58) Field of Classification Search
  CPC ........ H01G 4/1218; H01G 4/30; H01G 4/012; H01G 4/1236; C04B 2235/3418; C04B 2235/3262; C04B 35/62645
  See application file for complete search history.

(56) References Cited

U.S. PATENT DOCUMENTS

| | | | |
|---|---|---|---|
| 2007/0009719 A1* | 1/2007 | Naito | H01G 4/1236 428/210 |
| 2020/0043658 A1* | 2/2020 | Choi | H01G 4/232 |
| 2020/0199345 A1 | 6/2020 | Yamauchi et al. | |
| 2022/0189693 A1* | 6/2022 | Seo | H01G 4/248 |
| 2023/0215636 A1* | 7/2023 | Na | H01G 4/232 361/301.4 |

FOREIGN PATENT DOCUMENTS

| | | |
|---|---|---|
| JP | H09148175 A | 6/1997 |
| JP | H10335169 A | 12/1998 |
| JP | 2003226586 A * | 8/2003 |
| JP | 2005179105 A | 7/2005 |
| WO | 2018235907 A1 | 12/2018 |

\* cited by examiner

*Primary Examiner* — David M Sinclair (74) *Attorney, Agent, or Firm* — Law Office of Katsuhiro Arai (57) ABSTRACT

A ceramic electronic device includes a dielectric layer and an internal electrode layer that are alternately stacked, wherein the dielectric layer contains yttria-stabilized zirconia and $(Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$) as a main component, and wherein, in the dielectric layer, a concentration of the yttria-stabilized zirconia when a total amount of Ti and Zr is 100 mol % is 0.5 mol % or more and 5.0 mol % or less.

11 Claims, 8 Drawing Sheets

CERAMIC ELECTRONIC DEVICE INCLUDING DIELECTRIC LAYER CONTAINING PEROVSKITE COMPOUND WITH YTTRIA-STABILIZED ZIRCONIA, AND MANUFACTURING METHOD OF SAME

CROSS-REFERENCE TO RELATED APPLICATION

This application is based upon and claims the benefit of priority of the prior Japanese Patent Application No. 2021-126539, filed on Aug. 2, 2021 and the prior Japanese Patent Application No. 2022-110418, filed on Jul. 8, 2022, the entire contents of which are incorporated herein by reference.

FIELD

A certain aspect of the present disclosure relates to a ceramic electronic device, a dielectric material and a manufacturing method of the ceramic electronic device.

BACKGROUND

Ceramic electronic devices such as multilayer ceramic capacitors in which internal electrode layers and dielectric layers are alternately stacked are known. The ceramic electronic devices are produced by stacking a metal conductive paste for forming an internal electrode layer and a dielectric green sheet for a dielectric layer, and firing the stacked structure. During firing, the internal electrode layer containing metal as the main component shrinks faster than the dielectric layer, so cracks may occur in these layers. To prevent this, it is effective to lower the firing temperature. For example, Japanese Patent Application Publication No. H10-335169 hereinafter referred to as Patent Document 1 discloses a dielectric material that can be fired at 1300° C. or lower. Further, in Japanese Patent Application Publication No. 2005-179105 hereinafter referred to as Patent Document 2, the firing temperature is lowered by using a glass component having a low softening point temperature in a dielectric material.

SUMMARY OF THE INVENTION

According to an aspect of the embodiments, there is provided a ceramic electronic device including: a dielectric layer and an internal electrode layer that are alternately stacked, wherein the dielectric layer contains yttria-stabilized zirconia and $(Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$) as a main component, and wherein, in the dielectric layer, a concentration of the yttria-stabilized zirconia when a total amount of Ti and Zr is 100 mol % is 0.5 mol % or more and 5.0 mol % or less.

According to another aspect of the embodiments, there is provided a dielectric material including: yttria-stabilized zirconia; and $(Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$) as a main component, and wherein, a concentration of the yttria-stabilized zirconia when a total amount of Ti and Zr is 100 mol % is 0.5 mol % or more and 5.0 mol % or less.

According to another aspect of the embodiments, there is provided a manufacturing method of a ceramic electronic device including: forming a multilayer structure in which a dielectric green sheet including ceramic powders and a metal conductive paste for forming an internal electrode layer are alternately stacked; and firing the multilayer structure, wherein the ceramic powders include yttria-stabilized zirconia and $Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$) as a main component, and wherein, in the ceramic powders, a concentration of the yttria-stabilized zirconia when a total amount of Ti and Zr is 100 mol % is 0.5 mol % or more and 5.0 mol % or less.

DETAILED DESCRIPTION

In order to effectively suppress the cracking in the dielectric layer, it is preferable to further lower the firing temperature than the 1300° C. disclosed in Patent Document 1. Further, when the glass component is used as in Patent Document 2, the ceramic particles may be aggregated at the time of firing, the smoothness of the dielectric layer may be degraded, and the mechanical strength thereof may be lowered. Further, if an attempt is made to achieve both a low firing temperature and an improvement in mechanical strength, the quality of the dielectric layer may deteriorate.

Hereinafter, an exemplary embodiment will be described with reference to the accompanying drawings.

EXEMPLARY EMBODIMENT

Figure 1:
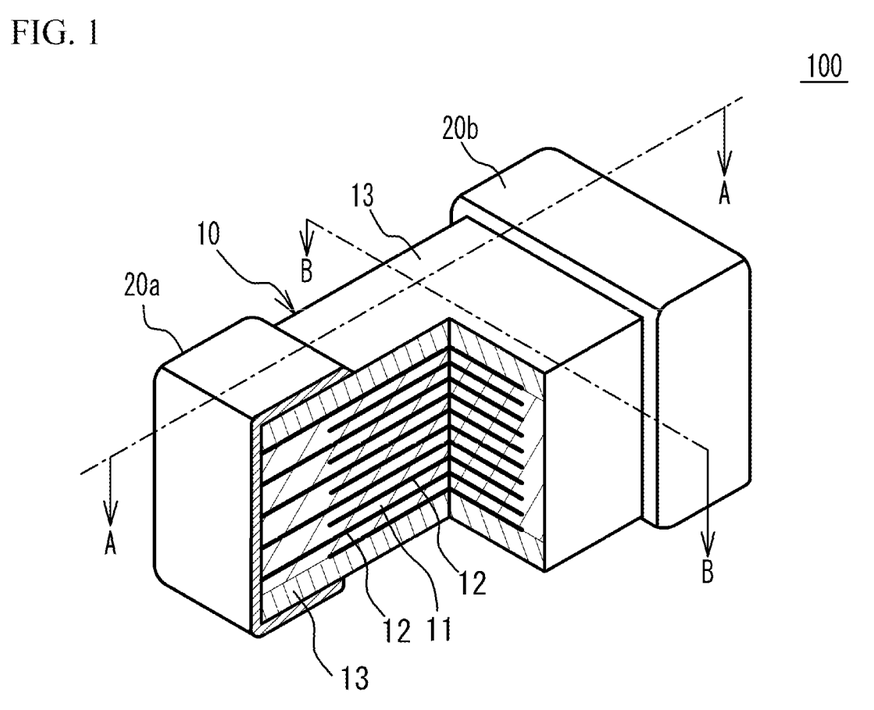
FIG. 1 is a partial cross-sectional perspective view of a multilayer ceramic capacitor.
Figure 2:
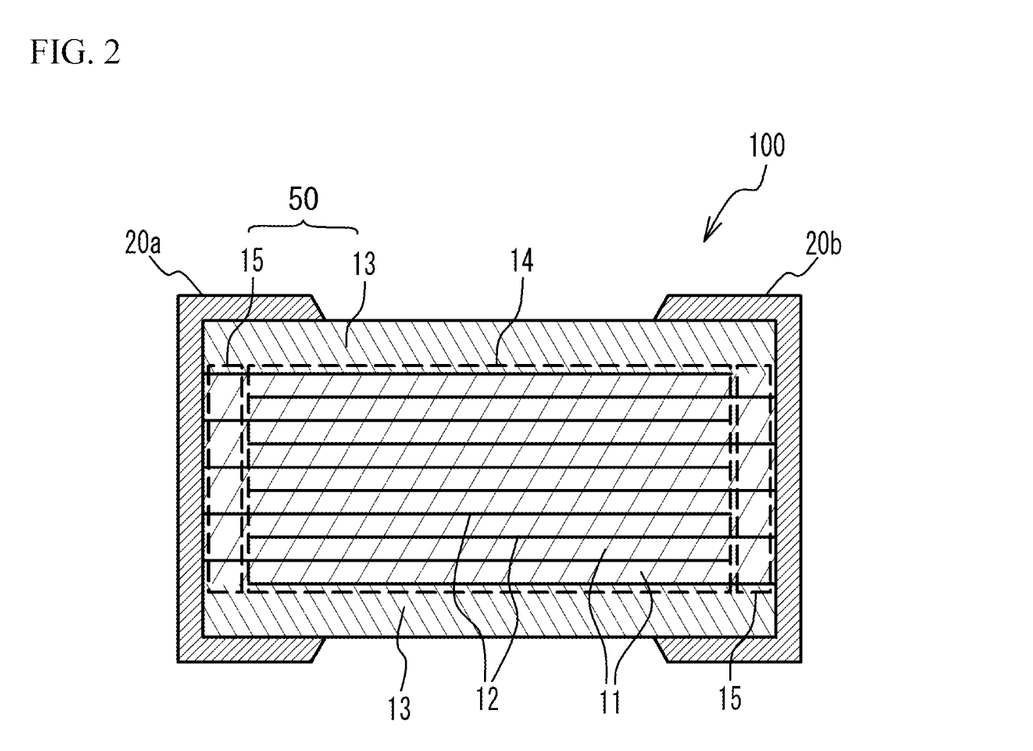
FIG. 2 is a cross-sectional view taken along line A-A in FIG. 1.
Figure 3:
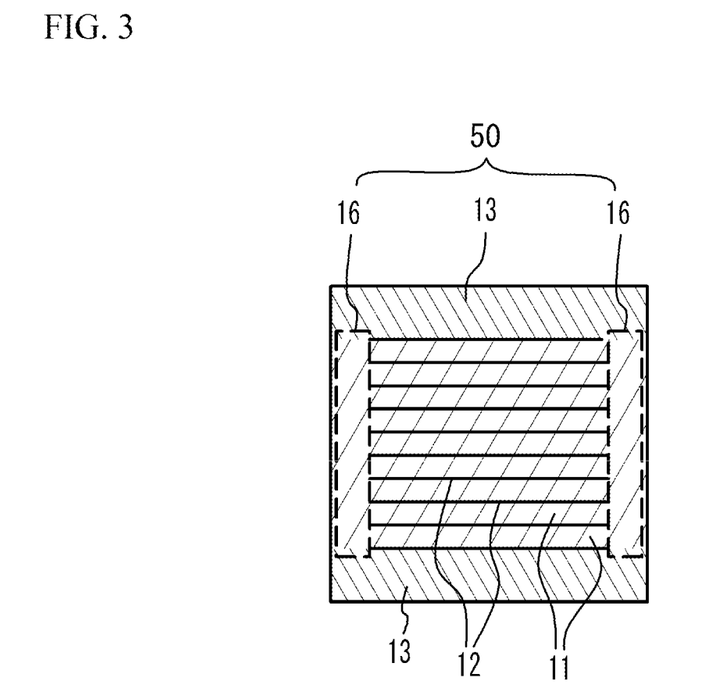
FIG. 3 is a cross-sectional view taken along line B-B in FIG. 1.

A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face. The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

A thickness of the dielectric layer 11 is preferably 2 μm or less from a viewpoint of increasing the capacity of the multilayer ceramic capacitor 100. A thickness of the internal electrode layer 12 is 0.3 μm or more and 1.5 μm or less, more preferably 0.5 μm or more and 1.0 μm or less. As a result, it is possible to suppress the generation of discontinuous regions in the internal electrode layer 12 while suppressing the cost increase due to the thickening of the internal electrode layer 12, and it is possible to stably fire the internal electrode layer 12. For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

The cover layers 13 and the side margins protect the capacity section 24 by covering the circumference of the capacity section 14. Hereinafter, the cover layers 13 and the side margins 16 are referred to as a protection section 50.

A main component of the internal electrode layer 12 is a base metal such as nickel (Ni), copper (Cu), or the like. The main component of the internal electrode layer 12 may be a noble metal such as platinum (Pt), palladium (Pd), silver (Ag), or gold (Au), tin (Sn) or alloy including one or more of them.

The dielectric layer 11 contains a perovskite compound as a main component and contains Y-stabilized zirconia ($ZrO_2$). Y-stabilized zirconia is yttria-stabilized zirconia and is sometimes called "YSZ". In this embodiment, $(Ca_{x1}Ba_{x2}Sr_{1-x1-x2})(Ti_yZr_{1-y})O_3$ is used as the perovskite compound. Y-stabilized zirconia is very strong by itself. Therefore, even if the dielectric layer 11 and the internal electrode layer 12 are fired at a low temperature, the mechanical strength of the dielectric layer 11 can be increased. The perovskite structure contains $ABO_{3-\alpha}$, which deviates from the stoichiometric composition.

Further, when the concentration of Y-stabilized zirconia exceeds 5.0 mol % when $(Ca_{x1}Ba_{x2}Sr_{1-x1-x2})(Ti_yZr_{1-y})O_3$ is 100 mol %, Y-stabilized zirconia suppresses densification of the dielectric layer 11 during the firing. Therefore, when the total amount of Ti and Zr in the dielectric layer 11 is 100 mol %, the concentration of Y-stabilized zirconia is preferably 5.0 mol % or less.

On the other hand, when the concentration of Y-stabilized zirconia is less than 0.5 mol %, sufficient mechanical strength of the dielectric layer 11 may not be necessarily achieved. Therefore, the concentration of Y-stabilized zirconia is preferably 0.5 mol % or more.

In the present embodiment, the composition ratios of the main components $(Ca_{x1}Ba_{x2}Sr_{1-x1-x2})(Ti_yZr_{1-y})O_3$ are set to $0.6 \leq x1 \leq 0.9$, $0 \leq x2 \leq 0.1$, $0 \leq y \leq 0$. The concentration of Y-stabilized zirconia is 0.5 mol % or more and 5.0 mol % or less when the total amount of Ti and Zr in the dielectric layer 11 is 100 mol %. Thereby, even if the dielectric layer 11 is fired at a low temperature, the quality such as the mechanical strength of the dielectric layer 11 can be maintained.

The dielectric layer of the multilayer ceramic capacitor is called Class 1 when the material is a normal dielectric, and is called Class 2 when the material is a ferroelectric substance. The dielectric layer 11 according to the present embodiment is a dielectric layer belonging to Class 1.

The temperature characteristics of the dielectric layer 11 of Class 1 may change as the thickness of the dielectric layer 11 becomes thinner. It is considered that this is due to the difference in the coefficient of thermal expansion between the internal electrode layer 12 and the dielectric layer 11. Y-stabilized zirconia also has a function of suppressing changes in temperature characteristics caused by strain of the dielectric layer 11 due to such a difference in thermal expansion coefficient. When Y-stabilized zirconia is not added to the dielectric layer 11, the composition ratios x1, x2, and y of the main component (Cax1Bax2Sr1-x1-x2)(TiyZr1-y)O3 are adjusted to suppress changes in temperature characteristics. In the present embodiment, the change in the temperature characteristics of the dielectric layer 11 can be suppressed by simply adjusting the added amount of Y-stabilized zirconium.

Further, the dielectric layer 11 may further contain a manganese compound, a silicon compound, and a boron compound. The sintering temperature of the dielectric layer 11 can be lowered by the combined action of these compounds. Examples of the manganese compound include MnO and $MnCO_3$, and examples of the silicon compound include $SiO_2$. Further, examples of the boron compound include boron oxide ($B_2O_3$), boron nitride (BN), boric acid ($H_3BO_3$ or $B(OH)_3$) and the like.

In particular, it is preferable that the amount of the manganese compound in the dielectric layer 11 is 0.2 mol % or more and 5.0 mil % or less in a shape of MnO. It is preferable that the amount of the silicon compound in the dielectric layer 11 is 0.5 mol % or more and 5.0 mol % or less in a shape of $SiO_2$. It is preferable that the amount of the boron compound in the dielectric layer 11 is 0.2 mol % or more and 1.0 mol % or less in a shape of $(B_2O_3)/2$. The compound concentrations are concentrations on a presumption that the total amount of Ti and Zr in the dielectric layer 11 is 100 mol %. By adopting these concentration ranges, it becomes easy to fire the dielectric layer 11 at a low temperature of 1220° C. or lower.

Figure 4:
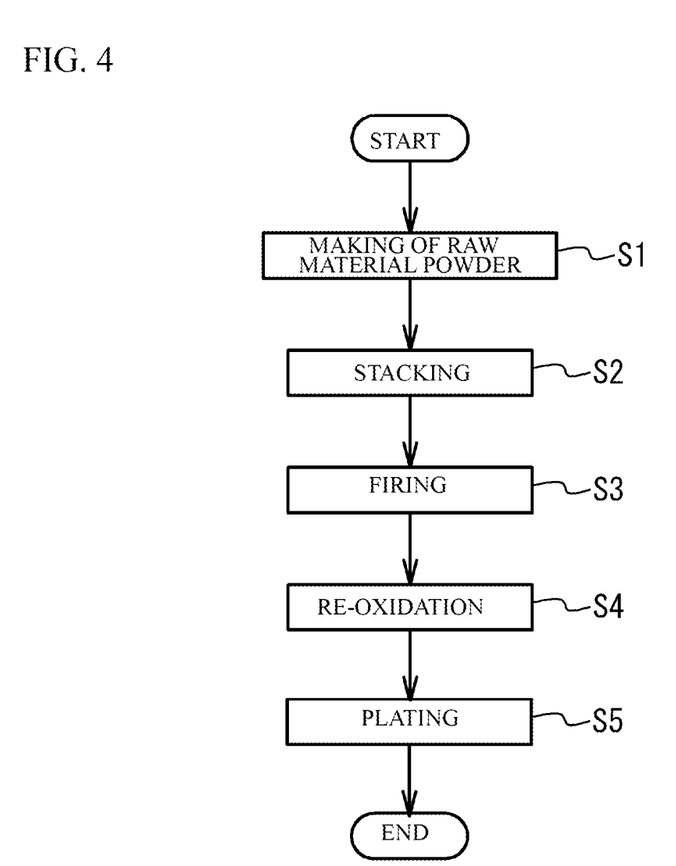
FIG. 4 illustrates a flow of a manufacturing method of a multilayer ceramic capacitor.

Next, the manufacturing method of the multilayer ceramic capacitor 100 will be described. FIG. 4 is a flowchart of the manufacturing method of the multilayer ceramic capacitor 100.

[Making of Raw Material Powder] (S1)

A starting material for forming the dielectric layer 11 is prepared. Here, as the starting material, $SrCO_3$ powder, $CaCO_3$ powder, $BaCO_3$ powder and $ZrO_2$ powder are prepared. Then, each powder is weighed. The weighed powder is dispersed in ion-exchanged water and a dispersant. Thus, a dielectric material is obtained.

Next, the dielectric material is dried, then subjected to dry pulverization, and further calcined at 1100° C. to obtain $(Ca_{x1}Ba_{x2}Sr_{1-x1-x2})(Ti_yZr_{1-y})O_3$ powder as the perovskite powder which is the main component of the dielectric layer 11. In this embodiment, $0.6 \leq x1 \leq 0.9$, $0 \leq x2 \leq 0.1$, and $0 \leq y \leq 0.1$.

Next, a reverse pattern material for forming the end margin 15 and the side margin 16 is prepared. The reverse pattern material includes a main component ceramic of the end margin of 15 and the side margin 16. As the main component ceramic, $(Ca_{x1}Ba_{x2}Sr_{1-x1-x2})(Ti_yZr_{1-y})O_3$ powder is prepared in the same manner as above.

Next, a cover material for forming the cover layer 13 is prepared. The cover material contains the main component ceramic of the cover layer 13. As the main component ceramic, $(Ca_{x1}Ba_{x2}Sr_{1-x1-x2})(Ti_yZr_{1-y})O_3$ powder is prepared in the same manner as above.

[Stacking Process] (S2)

Next, a ceramic powder obtained by adding a manganese compound, a silicon compound, a boron compound, and Y-stabilized zirconia to the perovskite powder obtained in the raw material powder making process is prepared. And the ceramic powder is prepared together with an organic solvent, a binder, a dispersant, and the like. Thus, a slurry is obtained by performing a ball mill treatment.

The concentration of yttria ($Y_2O_3$) in Y-stabilized zirconia is 3 mol % to 8 mol %. When the total amount of $ZrO_2$ and $Y_2O_3$ is 100 mol %, the solid solution of $ZrO_2$ and $Y_2O_3$ in which $ZrO_2$ is 97 mol % and $Y_2O_3$ is 3 mol % is hereinafter referred to as 3Y stabilized zirconia.

Similarly, when the total amount of $ZrO_2$ and $Y_2O_3$ is 100 mol %, the solid solution of $ZrO_2$ and $Y_2O_3$ in which $ZrO_2$ is 95 mol % and $Y_2O_3$ is 5 mol % is hereinafter referred to as 5Y stabilized zirconia.

Further, when the total amount of $ZrO_2$ and $Y_2O_3$ is 100 mol %, the solid solution of $ZrO_2$ and $Y_2O_3$ in which $ZrO_2$ is 92 mol % and $Y_2O_3$ is 8 mol % is hereinafter referred to as 8Y stabilized zirconia. Further, although 3Y-stabilized zirconia, 5Y-stabilized zirconia, and 8Y-stabilized zirconia are used below, stabilized zirconia in the range of 3Y to 8Y may be used.

The manganese compound is, for example, $MnCO_3$, which is added to the ceramic powder at a concentration of 0.2 mol % to 5.0 mol % in terms of MnO. On the other hand, the silicon compound is, for example, $SiO_2$, which is added to the ceramic powder at a concentration of 0.5 mol % to 5.0 mol %. Further, the boron compound is, for example, boron nitride, which is added to the ceramic powder at a concentration of 0.2 mol % to 1.0 mol % in terms of $(B_2O_3)/2$.

Since boron nitride is difficult to elute in an organic solvent, gelation of the slurry can be suppressed. In particular, boron nitride having a specific surface area of 100 $m^2/g$ or more and 300 $m^2/g$ or less can effectively suppress gelation of the slurry. $B_2O_3$ or boric acid may be used instead of boron nitride.

After that, the slurry is tape-casted on a base material such as a PET (polyethylene terephthalate) film to obtain a dielectric green sheet having a thickness of about 3 μm.

Next, a metal conductive paste is printed on the surface of the dielectric green sheet by screen printing or gravure printing. The metal conductive paste contains an organic binder. The metal conductive paste includes Ni powder. Ceramic particles are added as a co-material to the metal conductive paste. The main component of the ceramic particles is not particularly limited, but is preferably the same as the main component ceramic of the dielectric layer 11.

Figure 5A:
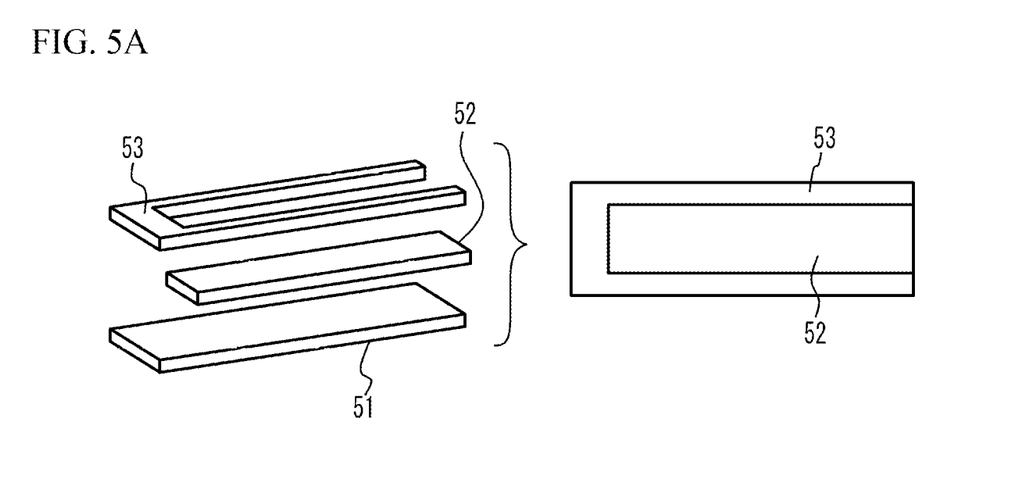
FIG. 5A and FIG. 5B illustrate a sacking process.

As illustrated in FIG. 5A, a first pattern 52 is formed on the surface of a dielectric green sheet 51 by printing a metal conductive paste for forming the internal electrode with use of screen printing or gravure printing. The metal conductive paste for forming the internal electrode contains an organic binder. The metal conductive paste includes Ni powder. Ceramic particles are added as the co-material to the metal conductive paste. The main component of the ceramic particles is not particularly limited, but is preferably the same as the main component ceramic of the dielectric layer 11.

Next, a binder such as ethyl cellulose and an organic solvent such as tarpineol are added to the reverse pattern material obtained in the raw material powder making process, and kneaded with a roll mill to obtain a reverse pattern paste for the reverse pattern layer. As illustrated in FIG. 5A, a second pattern 53 is formed by printing the reverse pattern paste in the peripheral region, where the first pattern 52 is not printed, on the dielectric green sheet 51 to cause the second pattern 53 and the first pattern 52 to form a flat surface.

Figure 5B:
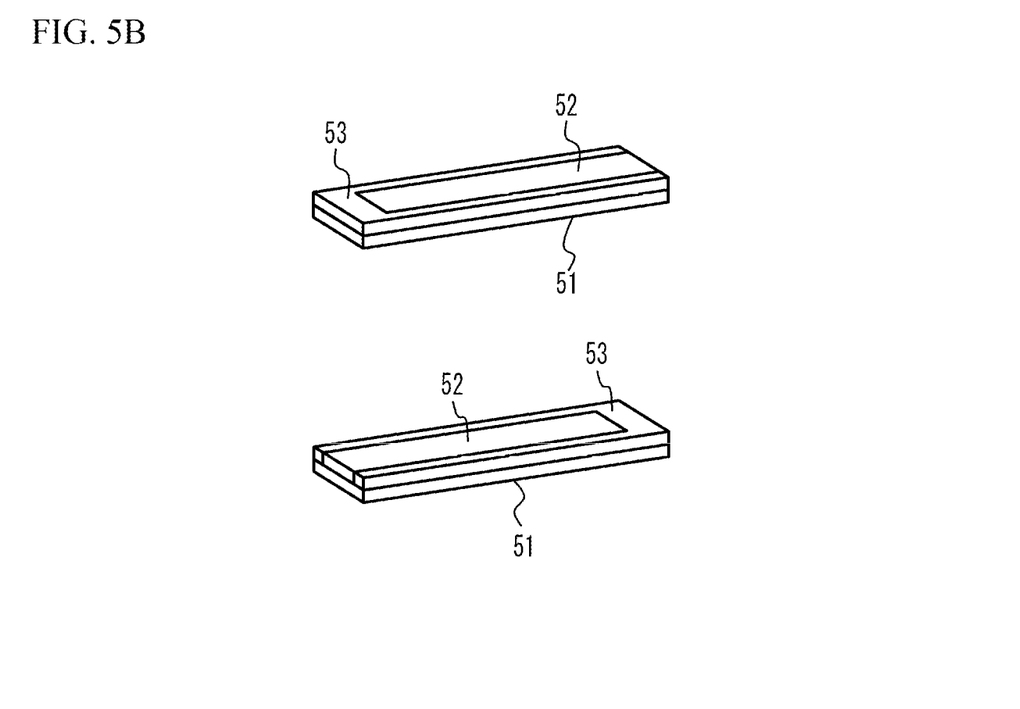

Thereafter, as illustrated in FIG. 5B, a predetermined number of stack units, in which the first pattern 52 and the second pattern 53 are printed on the dielectric green sheet 51, are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations. For example, 100 to 500 stack units are stacked.

Figure 6:
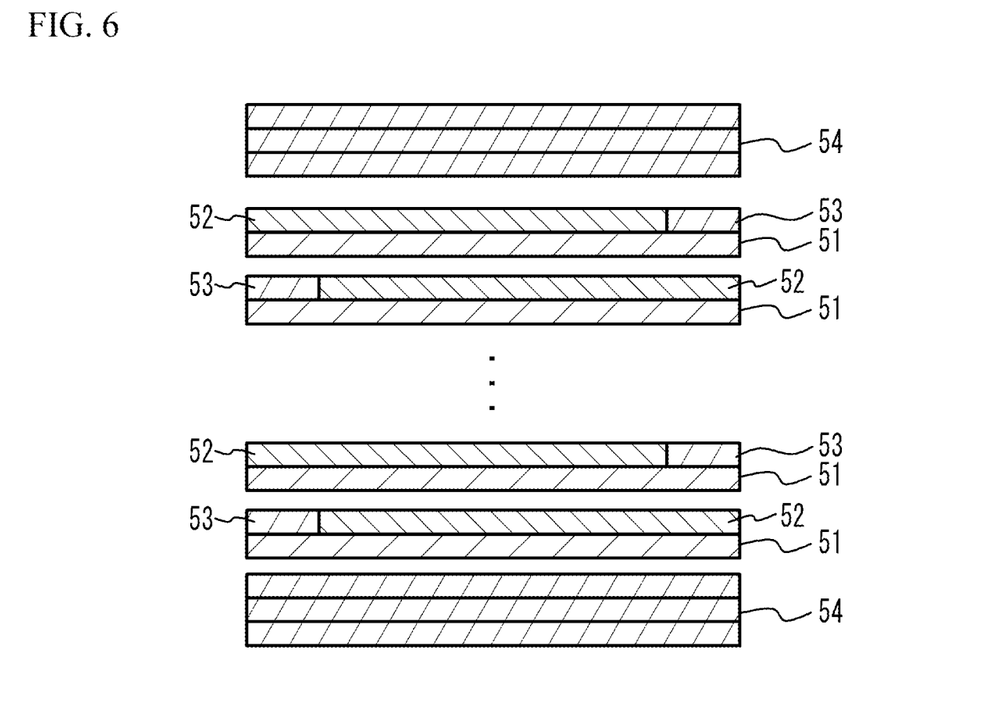
FIG. 6 illustrates a stacking process.

Next, a binder such as polyvinyl butyral (PVB) resin, an organic solvent such as ethanol and toluene, and a plasticizer are added to the cover material obtained in the raw material powder making process and wet-mixed. Using the obtained slurry, for example, a strip-shaped cover sheet 54 having a thickness of 10 μm or less is applied onto a base material by, for example, a die coater method or a doctor blade method, and dried. As illustrated in FIG. 6, a predetermined number (for example, 2 to 10) cover sheet 54 are stacked on the stacked stack units and under the stacked stack units. After that, the stacked structure is thermally crimped. The resulting stacked structure is stamped into a predetermined size (for example, 1.0 mm×0.5 mm). Thus, a ceramic multilayer structure is obtained. Alternatively, after stacking a predetermined number of the cover sheet 54 and crimping the cover sheets 54, the resulting cover sheets 54 may be attached to on the stacked stack units and under the stacked stack units.

In the methods of FIG. 5A to FIG. 6, the region in which the portion of the dielectric green sheet 51 corresponding to the first pattern 52, and the first pattern 52 are stacked is a multilayer portion in which a sheet including $(Ca_{x1}Ba_{x2}Sr_{1-x1-x2})(Ti_yZr_{1-y})O_3$ particles as the main component ceramic and a pattern of a metal conductive paste are alternately stacked. The regions in which a part of the dielectric green sheet 51 which protrudes from the first pattern 52, and the second pattern 53 are stacked correspond to the side margin sections arranged on both side faces of the multilayer portion.

Figure 7:
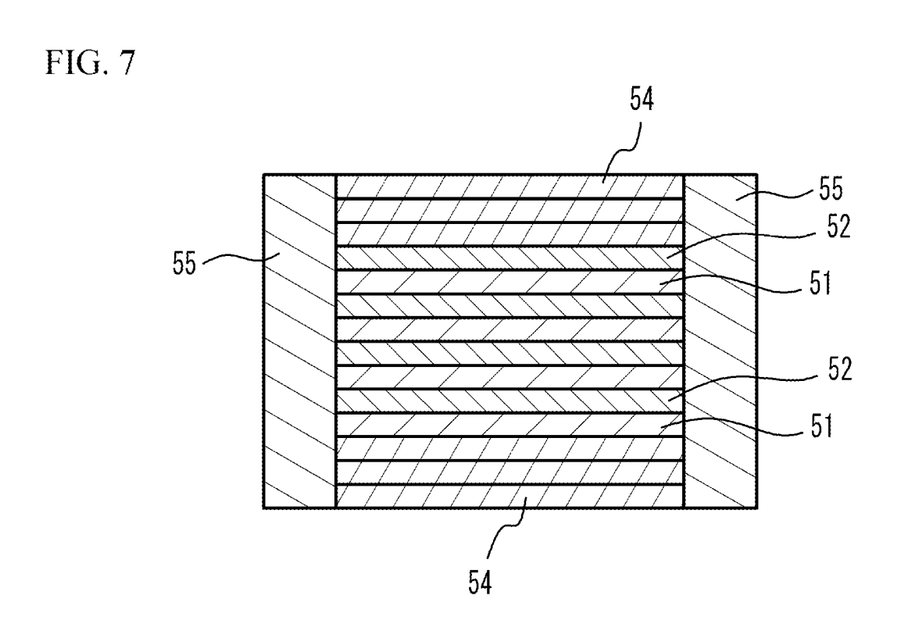
FIG. 7 illustrates a stacking process.

The side margin section may be attached or applied to the side faces of the multilayer portion. Specifically, as illustrated in FIG. 7, the dielectric green sheet 51 and the first pattern 52 having the same width as the dielectric green sheet 51 are alternately stacked to obtain the multilayer portion. Next, side margin sections 55 may be formed by attaching a sheet formed of the reverse pattern paste or by using the second pattern 53 obtained by painting the reverse pattern paste.

[Firing Process] (S3)

The binder is removed from the resulting ceramic multilayer structure in $N_2$ atmosphere. After that, a Ni paste to be the base layer of the external electrodes 20a and 20b is applied to the resulting ceramic multilayer by a dipping or the like. The resulting ceramic multilayer structure is fired in a reducing atmosphere with an oxygen partial pressure of $10^{-5}$ to $10^{-8}$ atm in a temperature of 1220° C. or less 10 minutes to 2 hours. Thus, the multilayer ceramic capacitor 100 is formed.

[Re-Oxidation Process] (S4)

After that, the multilayer ceramic capacitor 100 may be subjected to a re-oxidation process in a temperature range of 600 degrees C. to 1000 degrees C. in $N_2$ gas atmosphere.

[Plating Process] (S5)

After that, metal layers such as Cu, Ni, and Sn may be formed on the external electrodes 20a and 20b by plating.

According to the above-described embodiment, the dielectric layer 11 contains Y-stabilized zirconia and the main component $(Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$). And the concentration of Y-stabilized zirconia when the total amount of Ti and Zr in the dielectric layer 11 is 100 mol % is 0.5 mol % or more and 5.0 mol % or less.

Thereby, even if the temperature in the firing step is as low as 1220° C. or lower, the mechanical strength of the dielectric layer 11 can be increased by the mechanically strong Y-stabilized zirconia.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Next, examples and comparative examples will be described. Table 1 shows conditions of the examples and the comparative examples.

TABLE 1

| | $(Ca_{x1}Ba_{x2}Sr_{1-x})(Ti_yZr_{1-y})O_3$ | | | MnO | $SiO_2$ | $(B_2O_3)/2$ | Y-STABILIZED $ZrO_2$ | |
|---|---|---|---|---|---|---|---|---|
| | x1 | x2 | y | mol % | mol % | mol % | TYPE | mol % |
| EXAMPLE 1 | 0.7 | 0 | 0.03 | 1 | 1 | 0.3 | 3 Y | 2 |
| EXAMPLE 2 | 0.7 | 0 | 0.03 | 0.2 | 2 | 0.2 | 3 Y | 2 |
| EXAMPLE 3 | 0.7 | 0 | 0.03 | 1.5 | 1 | 0.3 | 3 Y | 2 |
| COMPARATIVE EXAMPLE 1 | 0.5 | 0 | 0.03 | 1 | 1 | 0.2 | 3 Y | 2 |
| EXAMPLE 4 | 0.6 | 0 | 0.03 | 1 | 3 | 0.2 | 3 Y | 2 |
| EXAMPLE 5 | 0.9 | 0 | 0.03 | 2 | 0.5 | 0.5 | 3 Y | 2.5 |
| COMPARATIVE EXAMPLE 2 | 0.95 | 0 | 0.03 | 1 | 1 | 0.3 | 3 Y | 3 |
| EXAMPLE 6 | 0.7 | 0 | 0 | 3 | 5 | 1 | 3Y | 1.5 |
| EXAMPLE 7 | 0.7 | 0 | 0.05 | 5 | 1 | 0.2 | 3Y | 2 |
| EXAMPLE 8 | 0.8 | 0 | 0.07 | 0.2 | 1 | 0.7 | 3Y | 1.5 |
| EXAMPLE 9 | 0.8 | 0 | 0.1 | 2 | 1 | 0.4 | 3Y | 0.5 |
| COMPARATIVE EXAMPLE 3 | 0.8 | 0 | 0.12 | 1.5 | 1 | 0.4 | 3Y | 1.5 |
| EXAMPLE 10 | 0.7 | 0 | 0.03 | 0.1 | 0.5 | 0.4 | 3Y | 1 |
| EXAMPLE 11 | 0.7 | 0 | 0.03 | 7 | 2 | 0.3 | 3Y | 3 |
| EXAMPLE 12 | 0.7 | 0 | 0.03 | 1 | 0.4 | 0.3 | 3Y | 2 |
| EXAMPLE 13 | 0.7 | 0 | 0.03 | 1 | 5.2 | 0.2 | 3Y | 3.5 |
| EXAMPLE 14 | 0.7 | 0 | 0.03 | 1 | 1 | 0.1 | 3Y | 1.5 |
| EXAMPLE 15 | 0.7 | 0 | 0.03 | 1.5 | 1.5 | 1.2 | 3Y | 1.5 |
| COMPARATIVE EXAMPLE 4 | 0.7 | 0 | 0.03 | 1 | 1 | 0.3 | 3Y | 0.3 |
| EXAMPLE 16 | 0.7 | 0 | 0.03 | 1 | 1 | 0.3 | 3Y | 5 |
| COMPARATIVE EXAMPLE 5 | 0.7 | 0 | 0.03 | 1.5 | 2 | 0.5 | 3Y | 7 |
| EXAMPLE 17 | 0.7 | 0 | 0.03 | 1 | 1 | 0.4 | 5Y | 1 |

TABLE 1-continued

| | $(Ca_{x1}Ba_{x2}Sr_{1-x})(Ti_yZr_{1-y})O_3$ | | | MnO | SiO$_2$ | $(B_2O_3)/2$ | Y-STABILIZED ZrO$_2$ | |
|---|---|---|---|---|---|---|---|---|
| | x1 | x2 | y | mol % | mol % | mol % | TYPE | mol % |
| EXAMPLE 18 | 0.7 | 0 | 0.04 | 1.5 | 1 | 0.3 | 5Y | 3 |
| EXAMPLE 19 | 0.7 | 0 | 0.04 | 2 | 1 | 0.3 | 8Y | 1 |
| EXAMPLE 20 | 0.7 | 0 | 0.04 | 1 | 2 | 0.5 | 8Y | 3 |
| EXAMPLE 21 | 0.7 | 0.01 | 0.03 | 1 | 1 | 0.3 | 3 Y | 2 |
| EXAMPLE 22 | 0.65 | 0.1 | 0.03 | 1 | 1 | 0.3 | 3Y | 2 |
| COMPARATIVE EXAMPLE 6 | 0.45 | 0.15 | 0.05 | 1 | 1 | 0.3 | 3Y | 2 |
| EXAMPLE 23 | 0.7 | 0 | 0.03 | 1 | 1 | 0.3 | 3Y | 2 |
| EXAMPLE 24 | 0.65 | 0.1 | 0.03 | 1 | 1 | 0.3 | 3Y | 2 |

Example 1

Each powder of $SrCO_3$, $CaCO_3$, $TiO_2$ and $ZrO_2$ was weighed and dispersed with ion-exchanged water and a dispersant in a ball mill to obtain a dielectric material. Next, the dielectric material was dried, then subjected to dry pulverization, and further calcined at 1100° C. to obtain $(Ca_{0.7}Sr_{0.3})(Ti_{0.03}Zr_{0.97})O_3$ powder as the perovskite powder, which was the main component of the dielectric layer 11.

In the perovskite powder, 1 mol % of manganese compound was added in a shape of $MnCO_3$, 1 mol % of silicon compound was added in a shape of $SiO_2$, and 0.3 mol % of boron compound was added in a shape of $(B_2O_3)/2$. Further, 2 mol % of 3Y stabilized zirconia was added to the perovskite powder. These concentrations are the concentrations when the total amount of Ti and Zr in the dielectric layer 11 of the finished product is 100 mol %. This also applies to each of the examples and the comparative examples described later.

The thickness of the dielectric layer 11 was 2 μm, and each number of layers of the internal electrode layer 12 and the dielectric layer 11 was 100.

Example 2

In the perovskite powder, 0.2 mol % of manganese compound was added in a shape of $MnCO_3$, 2 mol % of silicon compound was added in a shape of $SiO_2$, and 0.2 mol % of boron compound was added in a shape of $(B_2O_3)/2$. Other conditions were the same as those of the example 1.

Example 3

In the perovskite powder, 1.5 mol % of manganese compound was added in a shape of $MnCO_3$, 1 mol % of silicon compound was added in a shape of $SiO_2$, and 0.3 mol % of boron compound was added in a shape of $(B_2O_3)/2$. Other conditions were the same as those of the example 1.

Example 4

The value of x1 in $(Ca_{x1}Ba_{x2}Sr_{1-x1-x2})(Ti_yZr_{1-y})O_3$, which was a material for perovskite powder, was set to 0.6.

In the perovskite powder, 1 mol % of manganese compound was added in a shape of $MnCO_3$, 3 mol % of silicon compound was added in a shape of $SiO_2$, and 0.3 mol % of boron compound was added in a shape of $(B_2O_3)/2$. Other conditions were the same as those of the example 1.

Example 5

The value of x1 in $(Ca_{x1}Ba_{x2}Sr_{1-x1-x2})(Ti_yZr_{1-y})O_3$, which was a material for perovskite powder, was set to 0.9.

In the perovskite powder, 2 mol % of manganese compound was added in a shape of $MnCO_3$, 0.5 mol % of silicon compound was added in a shape of $SiO_2$, and 0.5 mol % of boron compound was added in a shape of $(B_2O_3)/2$. Further, 2.5 mol % of 3Y stabilized zirconia was added to the perovskite powder. Other conditions were the same as those of the example 1.

Example 6

The value of y in $(Ca_{x1}Ba_{x2}Sr_{1-x1-x2})(Ti_yZr_{1-y})O_3$, which was a material for perovskite powder, was set to 0.

In the perovskite powder, 3 mol % of manganese compound was added in a shape of $MnCO_3$, 5 mol % of silicon compound was added in a shape of $SiO_2$, and 1 mol % of boron compound was added in a shape of $(B_2O_3)/2$. Further, 1.5 mol % of 3Y stabilized zirconia was added to the perovskite powder. Other conditions were the same as those of the example 1.

Example 7

The value of y in $(Ca_{x1}Ba_{x2}Sr_{1-x1-x2})(Ti_yZr_{1-y})O_3$, which was a material for perovskite powder, was set to 0.05.

In the perovskite powder, 5 mol % of manganese compound was added in a shape of $MnCO_3$, 1 mol % of silicon compound was added in a shape of $SiO_2$, and 0.2 mol % of boron compound was added in a shape of $(B_2O_3)/2$. Other conditions were the same as those of the example 1.

Example 8

The value of x1 in $(Ca_{x1}Ba_{x2}Sr_{1-x1-x2})(Ti_yZr_{1-y})O_3$, which was the material of the perovskite powder, was set to 0.8, and the value of y was set to 0.07.

In the perovskite powder, 0.2 mol % of manganese compound was added in a shape of $MnCO_3$, 1 mol % of silicon compound was added in a shape of $SiO_2$, and 0.7 mol % of boron compound was added in a shape of $(B_2O_3)/2$. Further, 1.5 mol % of 3Y stabilized zirconia was added to the perovskite powder. Other conditions were the same as those of the example 1.

Example 9

The value of x1 in $(Ca_{x1}Ba_{x2}Sr_{1-x1-x2})(Ti_yZr_{1-y})O_3$, which was the material of the perovskite powder, was set to 0.8, and the value of y was set to 0.1.

In the perovskite powder, 2 mol % of manganese compound was added in a shape of $MnCO_3$, 1 mol % of silicon compound was added in a shape of $SiO_2$, and 0.4 mol % of boron compound was added in a shape of $(B_2O_3)/2$. Further, 0.4 mol % of 3Y stabilized zirconia was added to the perovskite powder. Other conditions were the same as those of the example 1.

Example 10

In the perovskite powder, 0.1 mol % of manganese compound was added in a shape of $MnCO_3$, 0.5 mol % of silicon compound was added in a shape of $SiO_2$, and 0.4 mol % of boron compound was added in a shape of $(B_2O_3)/2$. Further, 1 mol % of 3Y stabilized zirconia was added to the perovskite powder. Other conditions were the same as those of the example 1.

Example 11

In the perovskite powder, 7 mol % of manganese compound was added in a shape of $MnCO_3$, and 2 mol % of silicon compound was added in a shape of $SiO_2$. Further, 3 mol % of 3Y stabilized zirconia was added to the perovskite powder. Other conditions were the same as those of the example 1.

Example 12

$SiO_2$ was added as a silicon compound to the perovskite powder at a concentration of 0.4 mol %. Other conditions were the same as those of the example 1.

Example 13

In the perovskite powder, 5.2 mol % of silicon compound was added in a shape of $SiO_2$, and 0.2 mol % of boron compound was added in a shape of $(B_2O_3)/2$. Further, 3.5 mol % of 3Y stabilized zirconia was added to the perovskite powder. Other conditions were the same as those of the example 1.

Example 14

In the perovskite powder, 0.1 mol % of boron compound was added in a shape of $(B_2O_3)/2$. Further, 1.5 mol % of 3Y stabilized zirconia was added to the perovskite powder. Other conditions were the same as those of the example 1.

Example 15

In the perovskite powder, 1.5 mol % of manganese compound was added in a shape of $MnCO_3$, 1.5 mol % of silicon compound was added in a shape of $SiO_2$, and 1.2 mol % of boron compound was added in a shape of $(B_2O_3)/2$. Further, 1.5 mol % of 3Y stabilized zirconia was added to the perovskite powder. Other conditions were the same as those of the example 1.

Example 16

3Y stabilized zirconia was added to the perovskite powder at a concentration of 5 mol %. Other conditions were the same as those of the example 1.

Example 17

In the perovskite powder, 0.4 mol % of boron compound was added in a shape of $(B_2O_3)/2$. Further, 1 mol % of 5Y stabilized zirconia was added to the perovskite powder. Other conditions were the same as those of the example 1.

Example 18

The value of y in $(Ca_{x1}Ba_{x2}Sr_{1-x1-x2})(Ti_yZr_{1-y})O_3$, which was a material for perovskite powder, was set to 0.04.

In the perovskite powder, 1.5 mol % of manganese compound was added in a shape of $MnCO_3$. Further, 3 mol % of 5Y stabilized zirconia was added to the perovskite powder. Other conditions were the same as those of the example 1.

Example 19

The value of y in $(Ca_{x1}Ba_{x2}Sr_{1-x1-x2})(Ti_yZr_{1-y})O_3$, which was a material for perovskite powder, was set to 0.04.

In the perovskite powder, 2 mol % of manganese compound was added in a shape of $MnCO_3$. Further, 3 mol % of 8Y stabilized zirconia was added to the perovskite powder. Other conditions were the same as those of the example 1.

Example 20

The value of y in $(Ca_{x1}Ba_{x2}Sr_{1-x1-x2})(Ti_yZr_{1-y})O_3$, which was a material for perovskite powder, was set to 0.04.

In the perovskite powder, 2 mol % of silicon compound was added in a shape of $SiO_2$, and 0.5 mol % of boron compound was added in a shape of $(B_2O_3)/2$. Further, 3 mol % of 8Y stabilized zirconia was added to the perovskite powder. Other conditions were the same as those of the example 1.

Example 21

The value of x2 in $(Ca_{x1}Ba_{x2}Sr_{1-x1-x2})(Ti_yZr_{1-y})O_3$, which was a material for perovskite powder, was set to 0.01. Other conditions were the same as those of the example 1.

Example 22

The value of x1 in $(Ca_{x1}Ba_{x2}Sr_{1-x1-x2})(Ti_yZr_{1-y})O_3$, which was the material of the perovskite powder, was set to 0.65, and the value of x2 was set to 0.1. Other conditions were the same as those of the example 1.

Example 23

The thickness of the dielectric layer 11 was set to 0.7 µm. Other conditions were the same as those of the example 1.

Example 24

The value of x1 in $(Ca_{x1}Ba_{x2}Sr_{1-x1-x2})(Ti_yZr_{1-y})O_3$, which was a material for perovskite powder, was set to 0.65. Further, the thickness of the dielectric layer 11 was set to 0.7 µm. Other conditions were the same as those of the example 1.

Comparative Example 1

The value of x1 in $(Ca_{x1}Ba_{x2}Sr_{1-x1-x2})(Ti_yZr_{1-y})O_3$, which was a material for perovskite powder, was set to 0.5. In the perovskite powder, 0.2 mol % of boron compound was added in a shape of $(B_2O_3)/2$. Other conditions were the same as those of the example 1.

Comparative Example 2

The value of x1 in $(Ca_{x1}Ba_{x2}Sr_{1-x1-x2})(Ti_yZr_{1-y})O_3$, which was a material for perovskite powder, was set to 0.95. Further, 3Y stabilized zirconia was added to the perovskite powder at a concentration of 3 mol %. Other conditions were the same as those of the example 1.

Comparative Example 3

The value of x1 in $(Ca_{x1}Ba_{x2}Sr_{1-x1-x2})(Ti_yZr_{1-y})O_3$, which was the material of the perovskite powder, was set to 0.8, and the value of y was set to 0.12. In the perovskite powder, 1.5 mol % of manganese compound was added in a shape of $MnCO_3$, and 0.4 mol % of boron compound was added in a shape of $(B_2O_3)/2$. Further, 1.5 mol % of 3Y stabilized zirconia was added to the perovskite powder. Other conditions were the same as those of the example 1.

Comparative Example 4

3Y stabilized zirconia was added to the perovskite powder at a concentration of 0.3 mol %. Other conditions were the same as those of the example 1.

Comparative Example 5

In the perovskite powder, 1.5 mol % of manganese compound was added in a shape of $MnCO_3$, 2 mol % of silicon compound was added in a shape of $SiO_2$, and 0.5 mol % of boron compound was added in a shape of $(B_2O_3)/2$. Further, 7 mol % of 3Y stabilized zirconia was added to the perovskite powder. Other conditions were the same as those of the example 1.

Comparative Example 6

The value of x1 in $(Ca_{x1}Ba_{x2}Sr_{1-x1-x2})(Ti_yZr_{1-y})O_3$, which was the material of the perovskite powder, was 0.45, the value of x2 was 0.15, and the value of y was 0.05. Other conditions were the same as those of the example 1.

Table 2 is a table showing the results of quality investigation of the dielectric layer 11 according to each of the examples 1 to 19 and the comparative examples 1 to 11. As the quality of the dielectric layer 11, the relative permittivity (εr), the Q value, the temperature coefficient (τC), the accelerated life, and the three-point bending strength were adopted. Further, Table 2 also shows the firing temperature of the dielectric layer 11 and the ratio of the stabilized zirconia phase contained in the dielectric layer 11.

TABLE 2

| | FIRING TEMPERATURE (° C.) | RELATIVE PERMITTIVITY | Q | τ C (ppm/° C.) | ACCELARATED LIFE (h) | 3 POINT BENDING STRENGTH (Mpa) | STABILIZED $ZrO_2$(%) |
|---|---|---|---|---|---|---|---|
| EXAMPLE 1 | 1200 | 32 | 6000 | 19 | 1000 | 320 | 4.5 |
| EXAMPLE 2 | 1200 | 31 | 5600 | 18 | 800 | 315 | 4.7 |
| EXAMPLE 3 | 1200 | 31.5 | 6800 | 21 | 830 | 307 | 3 |
| COMPARATIVE EXAMPLE 1 | 1210 | 36 | 6100 | −347 | 910 | 310 | 3 |
| EXAMPLE 4 | 1210 | 35 | 6000 | −200 | 810 | 315 | 3.4 |
| EXAMPLE 5 | 1190 | 31 | 8000 | 28 | 1200 | 340 | 4 |
| COMPARATIVE EXAMPLE 2 | 1220 | 28 | 7700 | 25 | 1180 | 310 | 4.5 |
| EXAMPLE 6 | 1180 | 30 | 8000 | 34 | 730 | 350 | 2.8 |
| EXAMPLE 7 | 1180 | 32 | 3400 | −17 | 750 | 310 | 3.2 |
| EXAMPLE 8 | 1200 | 33 | 4500 | 23 | 770 | 310 | 1.5 |
| EXAMPLE 9 | 1200 | 35 | 4300 | −250 | 700 | 300 | 1 |
| COMPARATIVE EXAMPLE 3 | 1200 | 36 | 3400 | −375 | 650 | 310 | 3.3 |
| EXAMPLE 10 | 1200 | 29 | 5300 | 20 | 730 | 300 | 1.2 |
| EXAMPLE 11 | 1180 | 29.5 | 2500 | −15 | 750 | 300 | 4.6 |
| EXAMPLE 12 | 1180 | 30 | 3500 | −25 | 750 | 280 | 4.2 |
| EXAMPLE 13 | 1180 | 29 | 3300 | −30 | 880 | 350 | 6.8 |
| EXAMPLE 14 | 1180 | 29 | 4100 | −38 | 720 | 290 | 2.7 |
| EXAMPLE 15 | 1160 | 29 | 2000 | −35 | 540 | 320 | 2.5 |
| COMPARATIVE EXAMPLE 4 | 1220 | 34 | 6500 | −40 | 750 | 210 | 0.8 |
| EXAMPLE 16 | 1220 | 32 | 3000 | 120 | 760 | 330 | 10.8 |
| COMPARATIVE EXAMPLE 5 | | NOT DENSIFIED AT 1200° C. OR LESS | | | | | |
| EXAMPLE 17 | 1200 | 35 | 7800 | 5 | 730 | 340 | 1.6 |
| EXAMPLE 18 | 1200 | 34 | 5500 | 16 | 800 | 310 | 5.6 |
| EXAMPLE 19 | 1200 | 34 | 6100 | 3 | 750 | 320 | 1.8 |
| EXAMPLE 20 | 1200 | 33 | 3500 | 19 | 810 | 300 | 6.7 |
| EXAMPLE 21 | 1200 | 32 | 5900 | 20 | 1000 | 323 | 4.5 |
| EXAMPLE 22 | 1190 | 35 | 4800 | 59 | 800 | 310 | 3.5 |
| COMPARATIVE EXAMPLE 6 | 1180 | 45 | 3100 | 180 | 750 | 180 | 3.2 |
| EXAMPLE 23 | 1200 | 31 | 5700 | 11 | 880 | 310 | 4.3 |
| EXAMPLE 24 | 1200 | 33 | 5000 | 26 | 790 | 310 | 4.6 |

Here, the electrostatic capacity and the Q value were measured using an LCR meter under a setting condition of 1 kHz–1 Vrms. The relative permittivity εr was obtained from the electrostatic capacity C based on the following equation.

·εr=(C×thickness of the dielectric layer 11)/(number of layers of the dielectric layer 11×ε0×effective crossing area)

However, ε0 is the permittivity of the vacuum. The temperature coefficient (τC) is the amount of change (ppm) in electrostatic capacity when the temperature changes by 1° C. Here, the temperature coefficient was obtained from the difference in electrostatic capacity between 25° C. and 125° C. The electrostatic capacity was measured in a constant temperature bath.

The accelerated life was the average value of the time from heating the multilayer ceramic capacitor 100 to 200° C. in an electric field of 50 V/μm until the insulation resistance value drops by two orders of magnitude from the initial value.

The 3-point bending strength was an average value when a 3-point bending test was performed on a plurality of multilayer ceramic capacitors 100.

Here, the quality was accepted based on the market demand. When the relative permittivity was 29 or more, the relative permittivity was determined as good. When the Q value was 2000 or more, the Q value was determined as good. When the temperature coefficient was within the range of ±300 ppm/° C., the temperature coefficient was determined as good. When the accelerated life was 500 hours or more, the accelerated life was determined as good. When the three-point bending test was 250 MPa or more, the three-point bending was determined as good. As for the firing temperature, those that can be densified and fired at 1220° C. or lower were determined as good.

As shown in Table 2, in the examples 1 to 24, the qualities of the dielectric layer 11 were all within the acceptable range.

On the other hand, in the comparative example 1, the temperature coefficient was −347 ppm/° C., which was outside the acceptable range (range of ±300 ppm/° C.). This is because, in the comparative example 1, the value of the composition ratio x1 was less than 0.6 in $(Ca_{x1}Ba_{x2}Sr_{1-x1-x2})(Ti_yZr_{1-y})O_3$, which was the material of the perovskite powder.

Further, in the comparative example 2, the relative permittivity was 28, which was out of the acceptable range (29 or more). This is because, in the comparative example 2, the value of the composition ratio x1 in $(Ca_{x1}Ba_{x2}Sr_{1-x1-x2})(Ti_yZr_{1-y})O_3$, which was the material of the perovskite powder, exceeded 0.9.

In the comparative example 3, the temperature coefficient was −375 ppm/° C., which was outside the acceptable range (range of ±300 ppm/° C.). This is because, in the comparative example 3, the value of the composition ratio y exceeded 0.1 in $(Ca_{x1}Ba_{x2}Sr_{1-x1-x2})(Ti_yZr_{1-y})O_3$, which was the material of the perovskite powder.

In the comparative example 4, the three-point bending strength was 210 MPa, which was out of the acceptable range (250 MPa or more). This is because, in the comparative example 4, the amount of 3Y stabilized zirconia added to the perovskite powder was less than 0.5 mol %, and the strength was not improved by the stabilized zirconia.

In the comparative example 5, densifying was not achieved at a firing temperature of 1220° C. or lower. This is because, in the comparative example 10, the amount of 3Y stabilized zirconia added to the perovskite powder exceeded 5.0 mol %.

In the comparative example 6, the three-point bending strength was 180 MPa, which was out of the acceptable range (250 MPa or more). This is because, in the comparative example 11, the value of the composition ratio x1 was less than 0.6 and the value of the composition ratio x2 exceeded 0 $(Ca_{x1}Ba_{x2}Sr_{1-x1-x2})(Ti_yZr_{1-y})O_3$ which was the material of the perovskite powder.

From the above results, in order to maintain the quality of the dielectric layer 11 even when the dielectric layer 11 is fired at a temperature of 1220° C. or lower, the concentration of Y-stabilized zirconia should be 0.5 mol % or more and 5.0 mol % or less and the composition ratios of x1, x2, and y in $(Ca_{x1}Ba_{x2}Sr_{1-x1-x2})(Ti_yZr_{1-y})O_3$ are set to the range of $0.6 \leq x1 \leq 0.9$, $0 \leq x2 \leq 0.1$ and $0 \leq y \leq 0.1$.

Further, the thickness of the dielectric layer 11 of the examples 1 to 24 was 0.7 μm to 2 μm in each case, which was 2 μm or less which was advantageous for increasing the capacity of the multilayer ceramic capacitor 100. In the examples 1 to 24, the thin dielectric layer 11 can be fired at a temperature of 1220° C. or lower. Moreover, it is possible to the high-quality and high strength multilayer ceramic capacitor 100 satisfying the temperature characteristics of ±250 ppm/° C. that do not cause structural defects such as delamination and cracks in the dielectric layer 11 and satisfy the criteria of COK, COJ, COH, and COG of EIA (Electronic Industries Alliance) and the temperature characteristics of ±300 ppm/° C. corresponding to the R2H and S2K standards of EIA.

Figure 8:
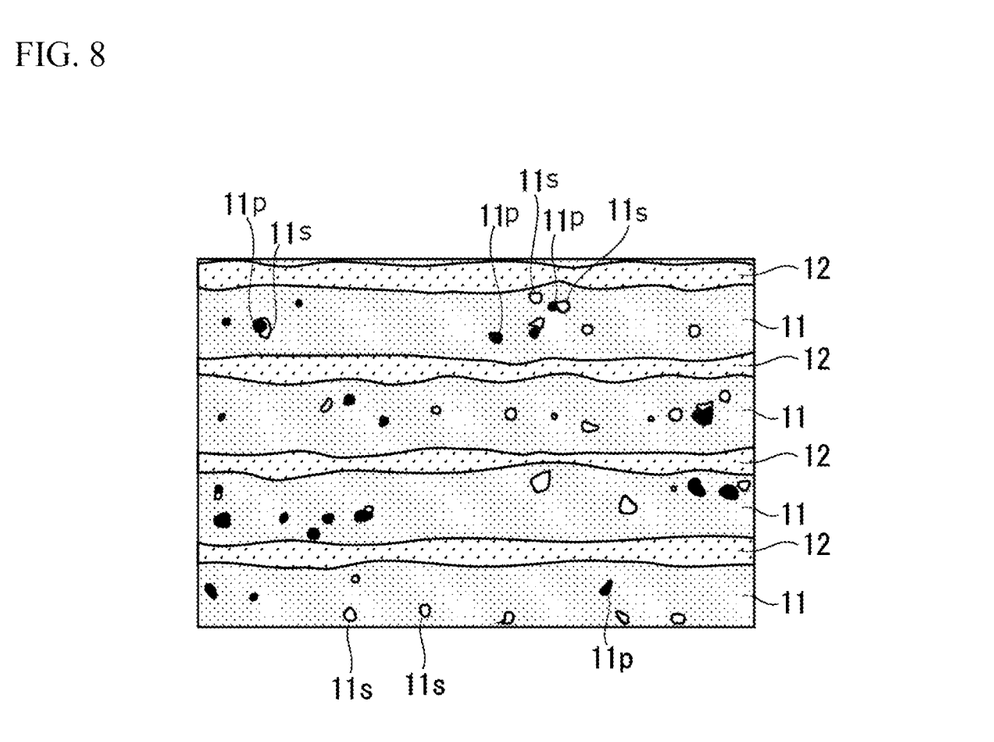
FIG. 8 shows a polished surface having a cross section perpendicular to a stacking direction of dielectric layer and internal electrode layer of a multilayer ceramic capacitor according to an example 1 in a SEM-EDS image.

FIG. 8 shows a polished surface having a cross section perpendicular to the stacking direction of the dielectric layer 11 and the internal electrode layer 12 of the multilayer ceramic capacitor 100 according to the example 1 in a SEM-BSE (Scanning Electron Microscope-Backscattered Electron). The SEM magnification was 5000 times. In FIG. 8, 11p represents a grain of Y-stabilized zirconia and 11s represents a void. As illustrated in FIG. 8, the presence of a Y-stabilized zirconia grain 11p in contact with a void 11s can suppress the elongation of cracks originating from the void.

For identification and quantification of the composition of the dielectric layer 11, in addition to chemical analysis by ICP (Inductively Coupled Plasma) emission spectroscopic analysis, the cross section of the dielectric layer 11 as illustrated in FIG. 8 is observed by SEM-EDS (Scanning Electron Microscope-Energy Dispersive X-ray Spectroscopy). In the analysis, a sufficiently large area is secured so as not to be affected by the segregated composition, and if necessary, the standard sample as the calibration curve is simultaneously analyzed, compared, and quantified to determine the reliability of the quantitative analysis value.

Further, as described above, when the concentration of Y-stabilized zirconia is 0.5 mol % or more and 5.0 mol % or less when the total amount of Ti and Zr in the dielectric layer 11 is 100 mol %, it has been clarified that the area ratio of the grains 11p of Y-stabilized zirconia in the cross section of the dielectric layer 11 is 1% or more and 15% or less. The area ratio is defined by the ratio of the total area of all the grains 11p contained in a region to the area of the region. The region is obtained by cutting out a region having an area of 10 μm² from an arbitrary position on the SEM cross section of the dielectric layer 11.

Further, a plurality of voids 11s are formed in the dielectric layer 11, and the toughness of the dielectric layer 11 is improved by the voids 11s. However, if the total area of the voids 11s is too large, the mechanical strength such as the three-point bending strength of the dielectric layer 11 will decrease. Therefore, by making the total area occupied by the voids 11s in the cross section of the dielectric layer 11 smaller than the total area occupied by the grains 11p in the cross section of the dielectric layer 11, it is preferable that reduction of the mechanical strength of the dielectric layer 11 caused by the voids 11s is suppressed.

The total area of the voids 11s is defined as the total value of the areas of all the voids 11s included in a region obtained by cutting out a region having an area of 10 µm$^2$ from an arbitrary position on the SEM cross section of the dielectric layer 11. Further, the total area of the grains 11p is defined as the total value of the areas of all the grains 11p included in the same region used to calculate the total area of the voids 11s.

Further, even if one of the voids 11s is too large, the mechanical strength of the dielectric layer 11 is lowered. Therefore, it is preferable that the longitudinal diameter of the void 11s in cross-sectional view is 0.1 µm or more and 0.6 µm or less. The lower limit of the longitudinal diameter is set to 0.1 µm because it is difficult to improve the toughness of the dielectric layer 11 with use of the voids 11s smaller than this. Further, the reason why the upper limit of the longitudinal diameter is set to 0.6 µm is that if the longitudinal diameter is larger than the upper limit, the mechanical strength of the dielectric layer 11 decreases due to the voids 11s.

More preferably, the longitudinal diameter of the void 11s in the cross-sectional view is preferably 0.15 µm or more and 0.3 µm or less. As a result, the mechanical quality of the dielectric layer 11 can be maintained in a high state.

Further, it is preferable that the grains 11p of Y-stabilized zirconia are in contact with the voids 11s in the cross section of the dielectric layer 11. As a result, it is possible to suppress the occurrence of cracks in the dielectric layer 11 starting from the voids 11s by the grains 11p having mechanical strength.

Although the embodiments of the present invention have been described in detail, it is to be understood that the various change, substitutions, and alterations could be made hereto without departing from the spirit and scope of the invention.

What is claimed is:

1. A ceramic electronic device comprising:
    a dielectric layer and an internal electrode layer that are alternately stacked,
    wherein the dielectric layer contains yttria-stabilized zirconia and $(Ca_{x1}Ba_{x2}Sr_{1-x1-x2})(Ti_yZr_{1-y})O_3$ ($0.6 \leq x1 \leq 0.9$, $0 \leq x2 \leq 0.1$, $0 \leq y \leq 0.1$) as a main component,
    wherein, in the dielectric layer, a concentration of the yttria-stabilized zirconia when a total amount of Ti and Zr is 100 mol % is 0.5 mol % or more and 5.0 mol % or less, and
    wherein an area ratio of grains of the yttria-stabilized zirconia is 1% or more and 15% or less in a cross section of the dielectric layer.

2. The ceramic electronic device as claimed in claim 1,
    wherein the dielectric layer includes a manganese compound, and
    wherein, in the dielectric layer, a concentration of the manganese compound is 0.2 mol % or more and 5.0 mol % or less in a shape of MnO, when the total amount of Ti and Zr is 100 mol %.

3. The ceramic electronic device as claimed in claim 1,
    wherein the dielectric layer includes a silicon compound, and
    wherein, in the dielectric layer, a concentration of the silicon compound is 0.5 mol % or more and 5.0 mol % or less in a shape of $SiO_2$, when the total amount of Ti and Zr is 100 mol %.

4. The ceramic electronic device as claimed in claim 1,
    wherein the dielectric layer includes a boron compound, and
    wherein, in the dielectric layer, a concentration of the boron compound is 0.2 mol % or more and 1.0 mol % or less in a shape of $(B_2O_3)/2$, when the total amount of Ti and Zr is 100 mol %.

5. The ceramic electronic device as claimed in claim 1,
    wherein the dielectric layer includes a plurality of voids, and
    wherein a total area of the plurality of voids is smaller than a total area of the grains of the yttria-stabilized zirconia, in a cross section of the dielectric layer.

6. The ceramic electronic device as claimed in claim 5, wherein each of longitudinal diameters of the plurality of voids is 0.1 µm or more and 0.6 µm or less.

7. The ceramic electronic device as claimed in claim 5, wherein at least one of the plurality of voids and at least one of the grains are in contact with each other.

8. The ceramic electronic device as claimed in claim 1, wherein a thickness of the dielectric layer is 2 µm or less.

9. The ceramic electronic device as claimed in claim 1, wherein a temperature coefficient obtained by a difference of an electrostatic capacity of the dielectric layer at 25 degrees C. and an electrostatic capacity of the dielectric layer at 125 degrees C. is −300 ppm/degrees C. or more and 300 ppm/degrees C. or less.

10. A manufacturing method of a ceramic electronic device comprising:
    forming a multilayer structure in which a dielectric green sheet including ceramic powders and a metal conductive paste for forming an internal electrode layer are alternately stacked; and
    firing the multilayer structure,
    wherein the ceramic powders include yttria-stabilized zirconia and $Ca_{x1}Ba_{x2}Sr_{1-x1-x2})(Ti_yZr_{1-y})O_3$ ($0.63 \leq x1 \leq 0.9$, $0 \leq x2 \leq 0.1$, $0 \leq y \leq 0.1$) as a main component, and
    wherein, in the ceramic powders, a concentration of the yttria-stabilized zirconia when a total amount of Ti and Zr is 100 mol % is 0.5 mol % or more and 5.0 mol % or less, and
    wherein, after the firing, in a dielectric layer formed from the dielectric green sheet, an area ratio of grains of the yttria-stabilized zirconia is 1% or more and 15% or less in a cross section of the dielectric layer.

11. The manufacturing method as claimed in claim 10,
    wherein the ceramic powders include a boron nitride,
    wherein a concentration of the boron nitride is 0.2 mol % or more and 1.0 mol % or less in a shape of $(B_2O_3)/2$, when the total amount of Ti and Zr is 100 mol % in the ceramic powders, and
    the boron nitride has a specific surface area of 100 m$_2$/g or more and 300 m$_2$/g or less.

* * * * *

UNITED STATES PATENT AND TRADEMARK OFFICE
CERTIFICATE OF CORRECTION

| | |
|---|---|
| PATENT NO. | : 12,051,545 B2 |
| APPLICATION NO. | : 17/864179 |
| DATED | : July 30, 2024 |
| INVENTOR(S) | : Yasuyuki Inomata |

Page 1 of 1

It is certified that error appears in the above-identified patent and that said Letters Patent is hereby corrected as shown below:

In the Claims

At Column 18, Line 45 (in Claim 10), "0.63" should be deleted, and --0.6-- should be inserted therefor.

At Column 18, Line 61 (in Claim 11), "$m_2$" should be deleted, and --$m^2$-- should be inserted therefor.

At Column 18, Line 62 (in Claim 11), "$m_2$" should be deleted, and --$m^2$-- should be inserted therefor.

Signed and Sealed this
First Day of October, 2024

Katherine Kelly Vidal
*Director of the United States Patent and Trademark Office*